(12) United States Patent
Ferguson et al.

(10) Patent No.: US 8,096,037 B2
(45) Date of Patent: Jan. 17, 2012

(54) WELL SCREEN FABRICATION

(75) Inventors: Carl B. Ferguson, La Porte, TX (US); Eric P. Boudreaux, New Iberia, LA (US); Teresa C. Kaminski, Magnolia, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1084 days.

(21) Appl. No.: 11/627,131

(22) Filed: Jan. 25, 2007

(65) Prior Publication Data

US 2008/0209710 A1 Sep. 4, 2008

(51) Int. Cl.
*B23P 11/02* (2006.01)
(52) U.S. Cl. ........................................................... 29/447
(58) Field of Classification Search .................... 29/447, 29/446, 428, 505; 166/381, 207, 228, 276, 166/233, 230, 236, 227
See application file for complete search history.

(56) References Cited

U.S. PATENT DOCUMENTS

| 4,200,218 | A |   | 4/1980 | Koehler |   |
|---|---|---|---|---|---|
| 4,377,894 | A | * | 3/1983 | Yoshida | 29/421.1 |
| 4,378,840 | A |   | 4/1983 | Lilly |   |
| 7,690,097 | B1 |   | 4/2010 | Cooper et al. |   |

FOREIGN PATENT DOCUMENTS

EP 1892373 B1 6/2009

OTHER PUBLICATIONS

SPE 68937, "A New Sand Screen Concept. No Longer the Weakest Link of the Completion String," dated 2001.
Schlumberger, "Wire-Wrap Screens," dated Jan. 2004.
Alloy Screen Works, "WildCatter™ All Welded Wrap-On Pipe Sand Control Screen," dated 2006.
Office Action issued May 27, 2011 for MX Patent Application No. MX/a/2008/001226, 2 pages.
English Translation of Mexican Office Action dated May 27, 2011 for MX Patent Application No. MX/a/2008/001226, 2 pages.

* cited by examiner

*Primary Examiner* — John C Hong
(74) *Attorney, Agent, or Firm* — Marlin R. Smith

(57) ABSTRACT

Well screen fabrication. A method of fabricating a well screen includes the steps of: providing a filter portion having an inner dimension, and then increasing the inner dimension, the providing and increasing steps being performed prior to installing the well screen in a wellbore. Another method of fabricating a well screen includes the steps of: providing a base pipe having an outer dimension, providing a filter portion having an inner dimension less than or equal to the outer dimension, then increasing the inner dimension to greater than or equal to the outer dimension, and then decreasing the inner dimension. Another method of fabricating a well screen includes the steps of: providing a base pipe having an outer dimension, providing a filter portion having an inner dimension, and then providing an interference fit between the inner and outer dimensions.

14 Claims, 4 Drawing Sheets

WELL SCREEN FABRICATION

BACKGROUND

The present invention relates generally to equipment utilized and operations performed in conjunction with a subterranean well and, in an embodiment described herein, more particularly provides improved sand control screen fabrication.

Well screens are used for a variety of purposes, including sand control, proppant exclusion, wellbore support, and other purposes. There is a need for well screens to be finely tuned instruments in performing their functions, while being rugged enough to withstand installation and use in a downhole environment.

Many conventional well screen designs have certain deficiencies which compromise their ability to satisfy these needs. Some designs provide highly accurate filtering functions, but are not sufficiently rugged. Other designs are very rugged, but are not sufficiently accurate.

For example, in one typical well screen design, a filter jacket is constructed and then a base pipe is inserted within the filter jacket, with a clearance existing between the base pipe and the filter jacket. During installation and use, this clearance means that the filter jacket is not adequately supported internally, which leads to damage and inaccurate filtering.

In another typical well screen design, a filter wire is wrapped around a base pipe, with spacer rods positioned between the wire and the base pipe. This manufacturing method produces a relatively rugged well screen, but the wire wrapping process is frequently inaccurate and the base pipe can become distorted during the wrapping process.

Therefore, it may be seen that improvements are needed in the art of well screen fabrication.

SUMMARY

In carrying out the principles of the present invention, well screens and associated fabrication methods are provided which solve at least one problem in the art. One example is described below in which a filter portion of a well screen is shrink fit onto a base pipe. Another example is described below in which the filter portion is constructed, then is installed on the base pipe, and then an interference fit between the filter portion and the base pipe is provided.

In one aspect of the invention, a method of fabricating a well screen is provided. The method includes the steps of: providing a filter portion having an inner dimension, and then increasing the filter portion inner dimension. The filter portion providing and inner dimension increasing steps are performed prior to installing the well screen in a wellbore.

In another aspect of the invention, a method of fabricating a well screen includes the steps of: providing a base pipe having an outer dimension, providing a filter portion having an inner dimension less than or equal to the base pipe outer dimension, then increasing the filter portion inner dimension to greater than or equal to the base pipe outer dimension, and then decreasing the filter portion inner dimension.

In yet another aspect of the invention, a method of fabricating a well screen is provided which includes the steps of: providing a base pipe having an outer dimension, providing a filter portion having an inner dimension, and then providing an interference fit between the base pipe outer dimension and the filter portion inner dimension.

These and other features, advantages, benefits and objects of the present invention will become apparent to one of ordinary skill in the art upon careful consideration of the detailed description of representative embodiments of the invention hereinbelow and the accompanying drawings, in which similar elements are indicated in the various figures using the same reference numbers.

DETAILED DESCRIPTION

It is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
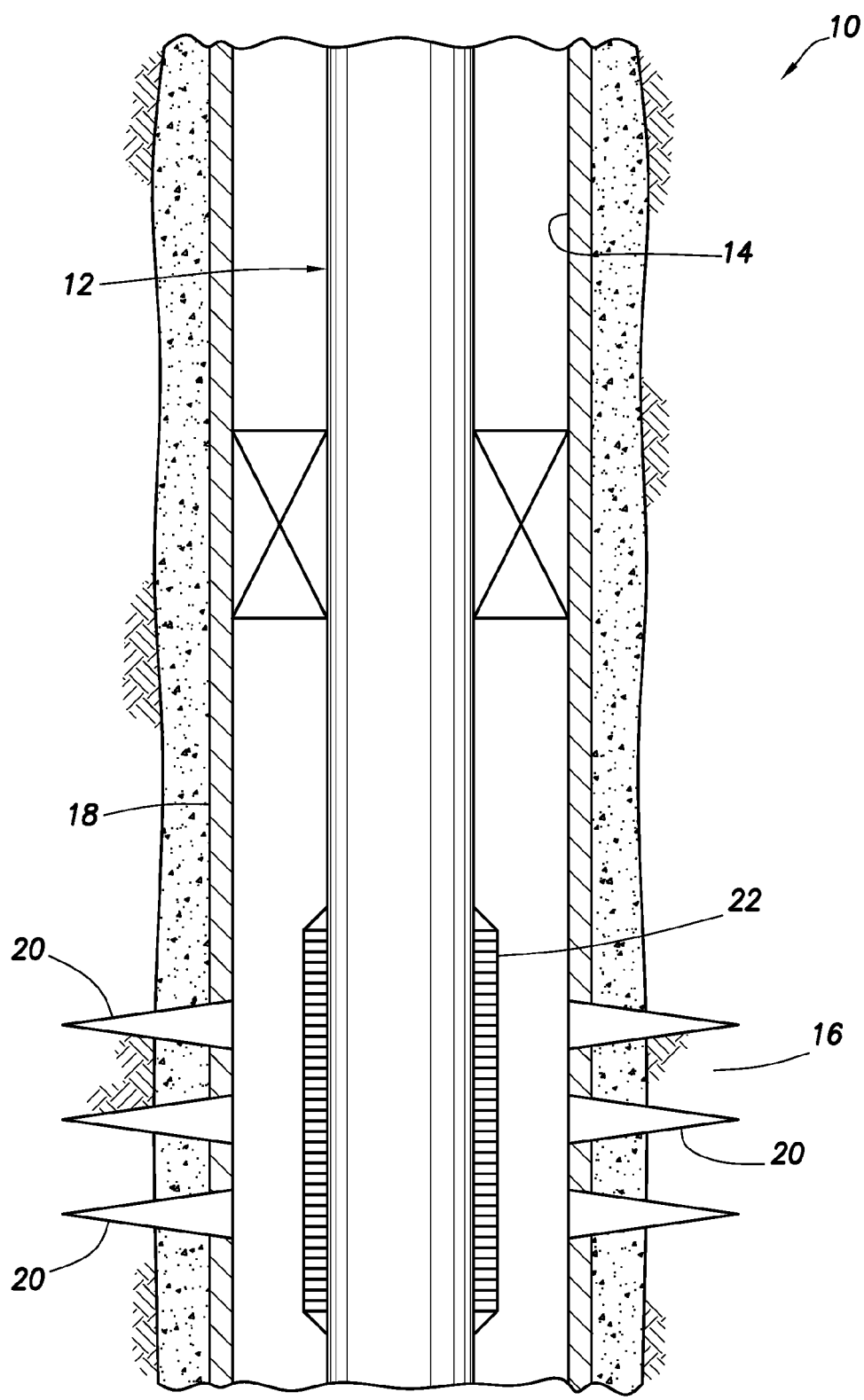
FIG. 1 is a schematic partially cross-sectional view of a well system embodying principles of the present invention.

Representatively illustrated in FIG. 1 is a well system 10 which embodies principles of the present invention. A tubular string 12 (such as a production tubing string) is installed in a wellbore 14 which intersects a formation or zone 16. The wellbore 14 is lined with casing 18.

Fluid from the zone 16 is produced through perforations 20 into the wellbore 14, and then via a well screen 22 into the tubular string 12. The fluid can then be produced to the surface.

Of course, the details of the well system 10 described herein are not necessary for practicing the invention in other embodiments. For example, the wellbore 14 could be uncased or open hole at the zone 16, in which case the perforations 20 would not be necessary. As another example, the well could be an injection well, rather than a production well, in which case fluid would flow outwardly through the well screen 22. Thus, it should be clearly understood that the well system 10 depicted in FIG. 1 is merely one example of a wide variety of useful applications of the principles of the invention.

Figure 2:
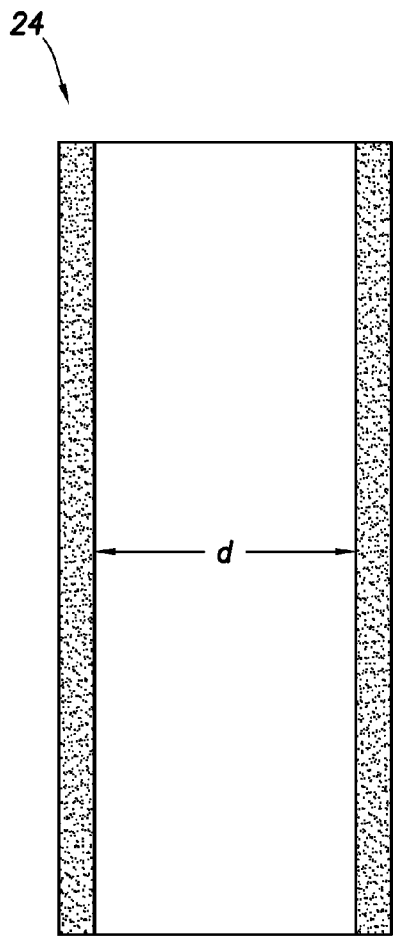
FIG. 2 is an enlarged scale schematic cross-sectional view of a filter portion of a well screen in the well system of FIG. 1.

Referring additionally now to FIG. 2, an enlarged scale cross-sectional view of a filter portion 24 of the well screen 22 is representatively illustrated. The filter portion 24 is illustrated apart from the remainder of the well screen 22.

In this view it may be clearly seen that the filter portion 24 is generally tubular in shape and has an inner dimension d.

The inner dimension d is an inner diameter in this embodiment, because the filter portion 24 has a generally annular cylindrical shape. In other embodiments, the filter portion 24 could have other shapes, such as polygonal, etc.

The inner dimension d can be increased and decreased using a variety of techniques. For example, the inner dimension d can be increased by heating the filter portion 24, and the inner dimension can be decreased by cooling the filter portion.

It should be clearly understood that the filter portion 24 as depicted in FIG. 2 is merely representative of a wide variety of filter portion types which may be used in keeping with the principles of the invention. For example, the filter portion 24 could be made of a sintered material, a prepacked filter jacket, a wire wrap, etc., or combinations of different filter types.

Figure 3:
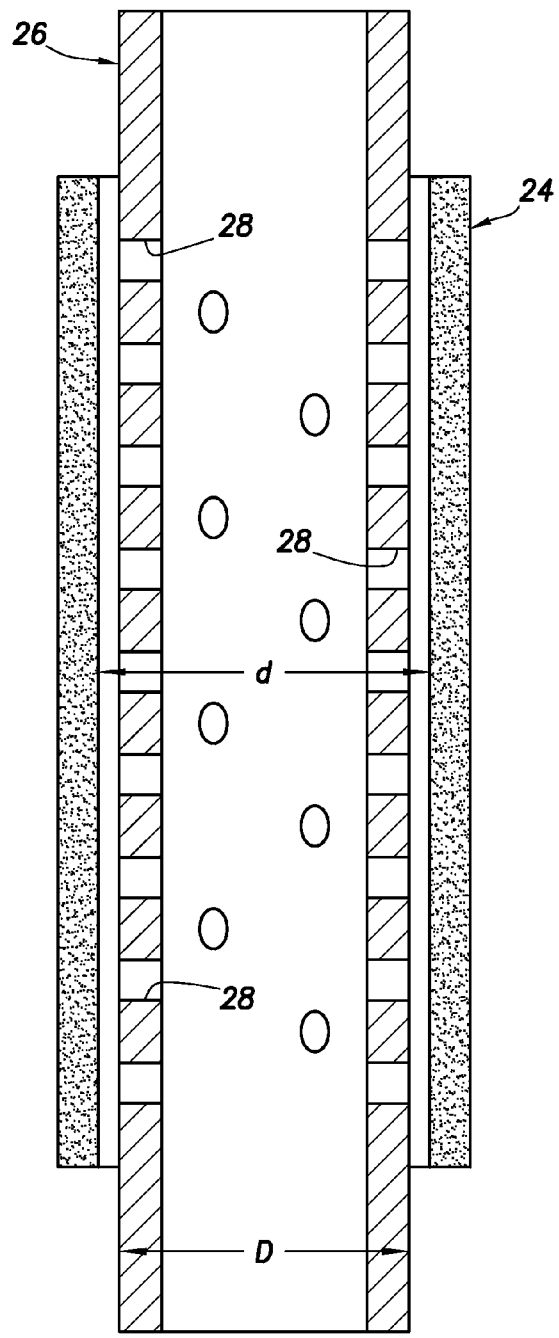
FIG. 3 is a schematic cross-sectional view of the filter portion and a base pipe of the well screen during a fabrication process.

Referring additionally now to FIG. 3, a base pipe 26 has been inserted into the filter portion 24. The base pipe 26 has a generally tubular shape, and openings 28 are provided for fluid flow between the interior and exterior of the base pipe. Note, however, that in other embodiments the openings 28 may not be used if, for example, devices such as inflow control devices or other flow control devices are used.

The base pipe 26 has an outer dimension D which, at the time of insertion of the base pipe into the filter portion 24, is preferably less than or equal to the filter portion inner dimension d. The outer dimension D is an outer diameter of the base pipe 26 as shown in FIG. 3, since the base pipe has a generally annular cylindrical shape, but the base pipe could have other shapes (such as polygonal, etc.).

In one fabrication method, the inner dimension d of the filter portion 24 is increased prior to inserting the base pipe 26 into the filter portion. Various techniques may be used for increasing the inner dimension d. One preferred technique is to heat the filter portion 24 to thereby cause it to expand.

When the inner dimension d is increased, it is preferably larger than the outer dimension D for ease of inserting the base pipe 26 therein. However, it will be appreciated that the inner dimension d could be increased so that it is equal to the outer dimension D, and the base pipe 26 could still be inserted into the filter portion 24.

In another fabrication method, the outer dimension of the base pipe 26 is decreased prior to inserting the base pipe into the filter portion 24. Various techniques may be used for decreasing the outer dimension D. One preferred technique is to cool the base pipe 26 to thereby cause it to shrink.

When the outer dimension D is decreased, it is preferably less than the inner dimension d for ease of inserting the base pipe 26 therein. However, it will be appreciated that the outer dimension D could be decreased so that it is equal to the inner dimension d, and the base pipe 26 could still be inserted into the filter portion 24.

In each of the fabrication methods described above (which are not mutually exclusive), the outer dimension D of the base pipe 26 is preferably greater than the inner dimension d of the filter portion 24 prior to increasing the inner dimension d and/or decreasing the outer dimension D. After the base pipe 26 is inserted into the filter portion 24, the filter portion is allowed to cool, and/or the base pipe is allowed to warm, so that an interference fit is obtained between the base pipe and filter portion.

This interference fit produces a gripping engagement between the interior of the filter portion 24 and the exterior of the base pipe 26. The filter portion 24 is, thus, well supported by the base pipe 26 during installation and use in the wellbore 14. In addition, separate construction of the filter portion 24 prior to insertion of the base pipe 26 therein provides for enhanced accuracy in the filtering structure, while preventing undesirable deformation of the base pipe.

Figures 4, 6:
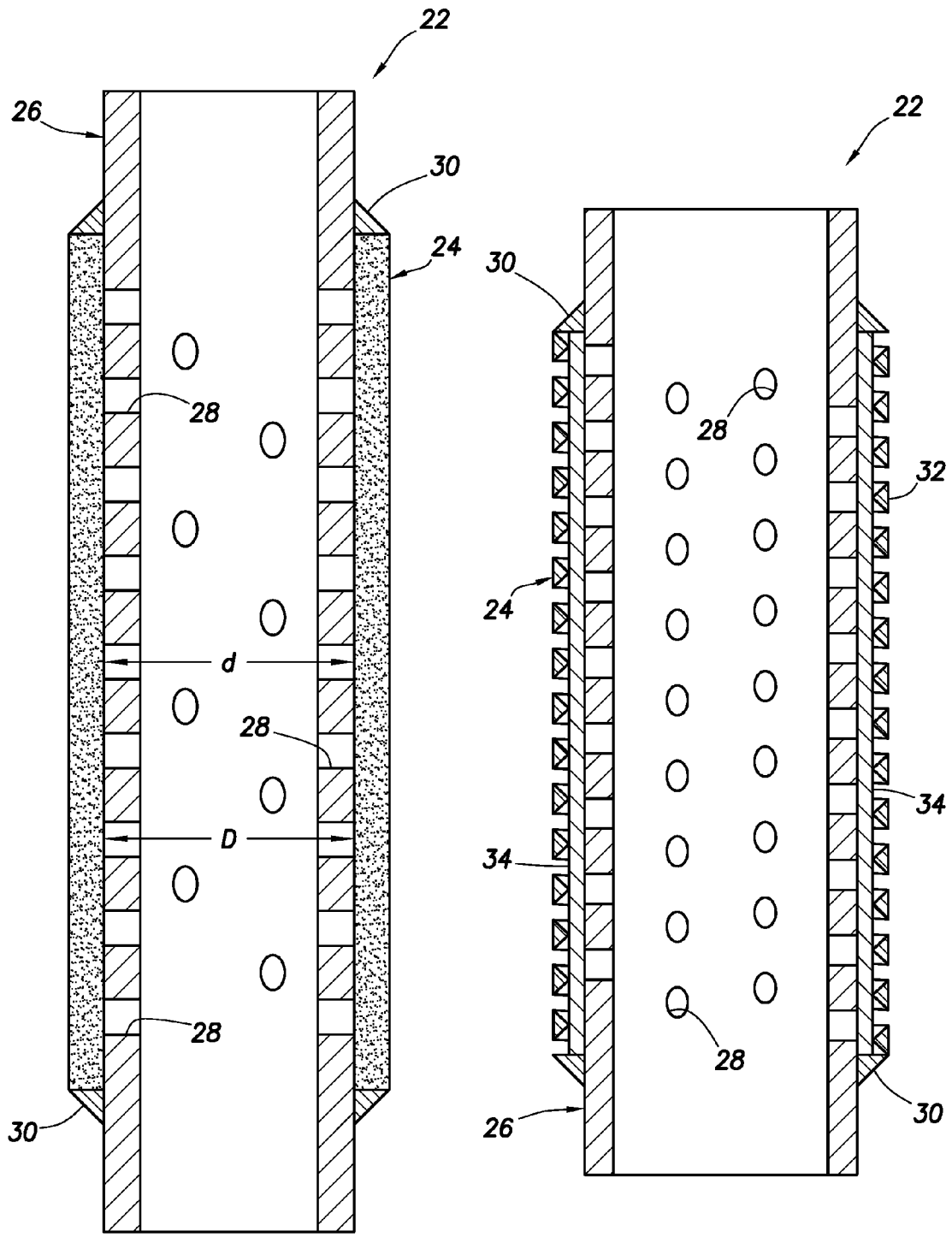
FIG. 4 is a schematic cross-sectional view of a completed well screen assembly.
FIG. 6 is a schematic cross-sectional view of the alternate configuration well screen after assembly.

Referring additionally now to FIG. 4, the well screen 22 is representatively illustrated after the inner dimension d has been decreased and/or the outer dimension D has been increased, so that there is an interference fit between the base pipe and filter portion. End support rings 30 may be used at either end of the filter portion 24, if desired, to provide longitudinal support to the filter portion, to provide a radial standoff from obstructions in the wellbore 14, etc. The support rings 30 may be attached by welding, interference fit, mechanical fasteners, or any other techniques or combination of techniques.

Note that it is not necessary for an interference fit to exist between the base pipe 26 and the filter portion 24. For example, it is possible for the inner dimension d to be equal to the outer dimension D, and for this condition to provide adequate support for the filter portion 24.

Figure 5:
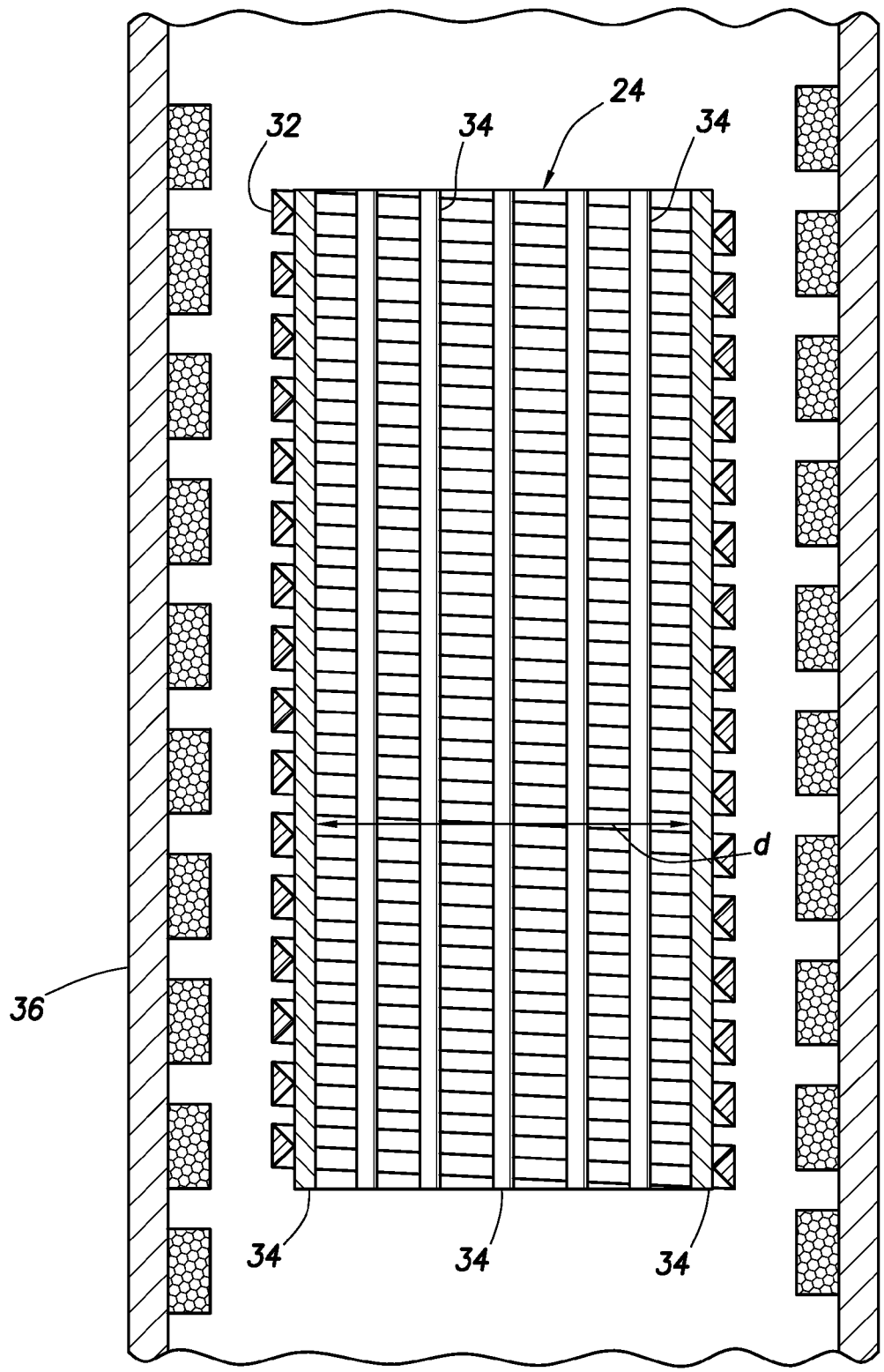
FIG. 5 is a schematic cross-sectional view of a filter portion of an alternate configuration of the well screen being heated during a fabrication process.

Referring additionally now to FIG. 5, an alternate configuration of the filter portion 24 is representatively illustrated. In this configuration, the filter portion 24 includes a filter wire 32 wrapped helically about multiple circumferentially spaced apart and longitudinally extending rods 34.

The inner dimension d is the interior width between the rods 34 in this configuration of the filter portion 24. As depicted in FIG. 5, the inner dimension d is being increased by heating the filter portion 24 in an induction heater 36.

Preferably, the inner dimension d is heated until it is greater than (or at least equal to) the outer dimension D of the base pipe 26. The base pipe 26 is then inserted into the heated filter portion 24, and the filter portion is allowed to cool, thereby decreasing the inner dimension d.

The well screen 22 is representatively illustrated in FIG. 6 after the base pipe 26 has been inserted into the filter portion 24, and the filter portion has cooled. There is now preferably an interference fit providing gripping engagement between the filter portion 24 (specifically, the rods 34) and the base pipe 26. As with the embodiment of FIG. 4, end support rings 30 may be used for longitudinal support, radial standoff, etc., if desired.

Instead of, or in addition to, heating the filter portion 24, the base pipe 26 could be cooled to decrease the outer dimension D prior to insertion of the base pipe into the filter portion. The outer dimension D would then increase as the base pipe 26 is heated, thereby providing the interference fit (or at least a close sliding fit) between the filter portion 24 and the base pipe.

It may now be fully appreciated that the fabrication methods described above provide significant improvements in the well screen art. The resulting well screen 22 has enhanced filtering accuracy, reduced undesirable deformation of the base pipe 26, and increased ruggedness.

Thus, one method of fabricating the well screen 22 has been described in which the filter portion 24 is provided having the inner dimension d, and then the inner dimension is increased. In the well system 10, these steps are performed prior to installing the well screen 22 in the wellbore 14.

The method can also include the step of decreasing the filter portion 24 inner dimension d. The inner dimension d is decreased after it is increased, and prior to installing the well screen 22 in the wellbore 14.

The method can include the step of positioning the base pipe 26 within the filter portion 24. This positioning step may be performed after the inner dimension d is increased, and prior to decreasing the inner dimension.

The step of increasing the inner dimension d may include increasing the inner dimension to greater than or equal to the outer dimension D of the base pipe 26. The step of decreasing the inner dimension d may include decreasing the inner dimension to less than or equal to the outer dimension D of the base pipe 26. The step of increasing the inner dimension d may include heating the filter portion 24.

Another method of fabricating the well screen 22 has been described in which the filter portion 24 has the inner dimension d which is initially less than or equal to the base pipe 26 outer dimension D. Then the filter portion 24 inner dimension d is increased to greater than or equal to the base pipe 26 outer dimension D, and then the filter portion inner dimension is decreased.

Yet another method of fabricating the well screen 22 has been described in which the base pipe 26 is provided having an outer dimension D, the filter portion 24 is provided having an inner dimension d, and then an interference fit is provided between the base pipe outer dimension and the filter portion inner dimension.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A method of fabricating a well screen, the method comprising the steps of:
   providing a filter portion having an inner dimension;
   providing a base pipe having an outer dimension and fluid communication being permitted through a sidewall of the base pipe;
   then increasing the filter portion inner dimension and decreasing the base pipe outer dimension;
   then positioning the base pipe within the filter portion; and
   then increasing the base pipe outer dimension by thermal expansion and decreasing the filter portion inner dimension, thereby providing gripping engagement between the filter portion and the base pipe.

2. The method of claim 1, wherein the step of increasing the filter portion inner dimension and decreasing the base pipe outer dimension further comprises causing the inner dimension of the filter portion to be greater than or equal to the outer dimension of the base pipe.

3. The method of claim 1, wherein the step of increasing the filter portion inner dimension and decreasing the base pipe outer dimension further comprises heating the filter portion and cooling the base pipe.

4. The method of claim 3, wherein the heating is performed by an induction heater.

5. The method of claim 1, wherein the step of decreasing the filter portion inner dimension and increasing the base pipe outer dimension further comprises cooling the filter portion and heating the base pipe.

6. The method of claim 1, wherein the filter portion comprises a filter wire which is wrapped about multiple spaced apart spacer rods.

7. The method of claim 6, wherein the step of decreasing the filter portion inner dimension and increasing the base pipe outer dimension further comprises providing gripping engagement between the rods and the base pipe.

8. A method of fabricating a well screen, the method comprising the steps of:
   providing a base pipe having an outer dimension, with fluid communication being permitted through a sidewall of the base pipe;
   providing a filter portion having an inner dimension; and
   then providing an interference fit between the base pipe outer dimension and the filter portion inner dimension by decreasing the base pipe outer dimension, and then increasing the base pipe outer dimension by thermal expansion.

9. The method of claim 8, wherein the interference fit providing step further comprises increasing the filter portion inner dimension and then decreasing the filter portion inner dimension.

10. The method of claim 9, wherein the interference fit providing step further comprises heating and then cooling the filter portion.

11. The method of claim 10, wherein the heating is performed by an induction heater.

12. The method of claim 8, wherein the interference fit providing step further comprises cooling and then heating the base pipe.

13. The method of claim 8, wherein the filter portion providing step further comprises wrapping a filter wire about multiple spaced apart spacer rods.

14. The method of claim 13, wherein the interference fit providing step further comprises providing gripping engagement between the rods and the base pipe.

* * * * *